United States Patent Office 3,428,705
Patented Feb. 18, 1969

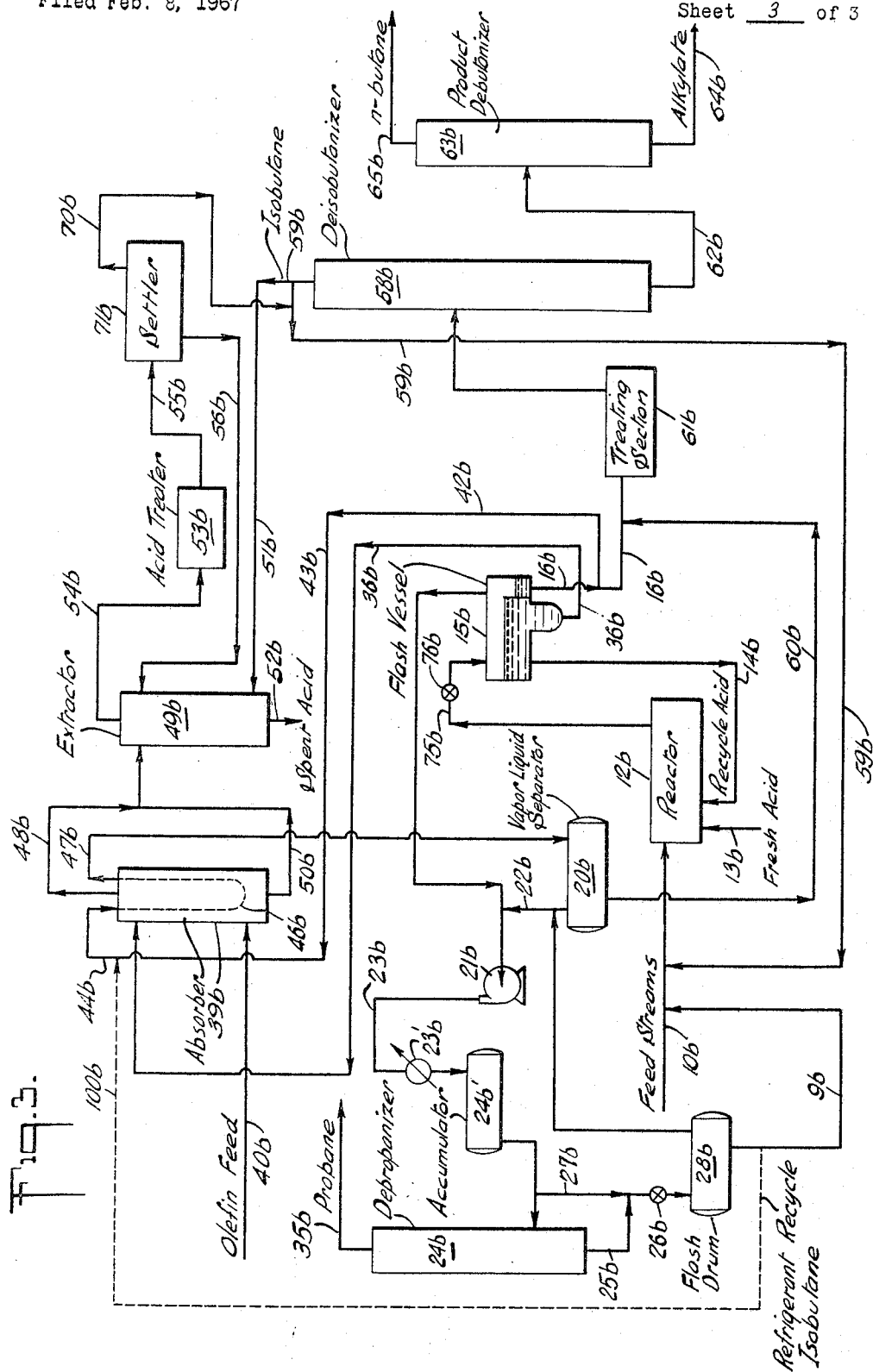

3,428,705
ACID RECOVERY PROCESS-ALKYLATION
PROCESS
Arthur R. Goldsby, Chappaqua, N.Y., assignor to Texaco
Inc., New York, N.Y., a corporation of Delaware
Continuation-in-part of applications Ser. No. 510,904,
Dec. 1, 1965, and Ser. No. 516,448, Dec. 25, 1965.
This application Feb. 8, 1967, Ser. No. 614,695
U.S. Cl. 260—683.62                         16 Claims
Int. Cl. C07c *3/54;* F24j *1/04*

ABSTRACT OF THE DISCLOSURE

This disclosure is directed to a combined alkylation process—acid recovery process—in which sulfuric acid is used in the alkylation process of an isoparaffin with an olefin and used sulfuric acid is fed into an absorption system to which there is introduced olefin to form dialkyl sulfate. An effluent comprising normally gaseous hydrocarbons in the form of a liquid under pressure is withdrawn from the alkylation process and eventually sent within a suitable coil or the like within or outside the absorption zone to effect indirect heat exchange thereby controlling the exothermic nature of the absorption reaction and lessening the load upon the alkylation phase of the process.

CROSS REFERENCES TO RELATED APPLICATIONS

This application is a continuation-in-part of application Ser. No. 510,904, filed Dec. 1, 1965 and application Ser. No. 516,448, filed Dec. 25, 1965 both of which are continuation-in-part applications of then copending application Ser. No. 386,486, filed July 28, 1964, now U.S.P. 3,234,301 which was a continuation-in-part of Ser. No. 50,161, filed Aug. 17, 1960, now abandoned.

BACKGROUND OF THE INVENTION

The alkylation of an isoparaffin with an olefin can proceed readily in an alkylation zone to which there is introduced sulfuric acid. The sulfuric acid acts as a catalyst and provides substantially quantitative yield of the corresponding alkylate. However, in the course of the reaction, some alkylation contaminants are formed due to a reaction which forms a product believed to be largely a cyclic conjugated diene of the olefin employed. In commercial operations, it is desirable to utilize the sulfuric acid rather than discharge it as a spent stream. However, it is very desirable that the alkylation contaminants be removed for the sake of the overall process efficiency. This has been provided by a process which entails the absorption of olefin in used sulfuric acid containing alkylation contaminant, separation of the contaminant thereafter and charging the so formed dialkyl sulfate into the alkylation reaction with any make-up sulfuric acid as may be necessary together with the isoparaffin to be alkylated and additional olefin. Substantial quantity of the alkylate is formed. Excess isoparaffin, normally gaseous at room temperature is used and is recycled to the reaction in some manner.

The absorption operation wherein the oleffin is absorbed in used sulfuric acid to form dialkyl sulfate is characterized by a large increase in the ambient temperature due to the exothermic nature of the reaction. This make control of the reaction difficult and increases the burden upon the alkylation reaction, i.e. forces the alkylation process to cope with the variance in temperature. Control of the temperature is essential or otherwise an excessive amount of undesired reactions takes place. It would be most desirable to utilize the chemicals in the system in a cooling operation rather than to utilize standard cooling and other methods entailing the outlay of substantial amounts of funds to provide the needed and desired cooling and temperature controlling effect upon the absorption step.

OBJECTS OF THE INVENTION

It is an object of this invention, therefore, to provide a combined alkylation-absorption process wherein sulfuric acid catalyst is employed in the alkylation step and used sulfuric acid is fed into the absorption step to absorp olefin in the absorption step to form dialkyl sulfates and to charge the dialkyl sulfates formed to an alkylation zone wherein the absorption step can be readily controlled with respect to temperature within a relatively narrow temperature range.

Still another object of this invention, therefore, is to provide such a method for controlling the temperature of the absorption zone which utilizes readily available equipment and chemicals within the plant.

These and other objects of this invention will become apparent from the following more complete description of my invention, accompanying drawings and appended claims.

SUMMARY OF THE INVENTION

Broadly, this invention contemplates an improvement in the process of alkylating an isoparaffin with an olefin wherein said isoparaffin and said olefin are charged into an alkylation zone together with sulfuric acid and used sulfuric acid is withdrawn and fed into an absorption zone to which is admitted olefin to form an alkyl sulfate and the alkyl sulfate is thereafter charged into an alkylation zone, the improvement comprising passing at least a portion of a normally gaseous hydrocarbon effluent in liquid phase from said alkylation zone in indirect heat exchange with at least a portion of the contents of said absorption zone effecting cooling thereof.

As will appear hereinbelow, one of the main advantages of my invention is that cooling is furnished in the absorption section by a redistribution of the available refrigerant utilized with maximum effectiveness. The available refrigerant is an effluent or a portion of an effluent directly or indirectly from the alkylation zone. For example, isobutane can be employed in a flashing operation when passed through the absorption zone in indirect heat exchange. The isobutane is withdrawn as a liquid from the alkylation unit or is separated from the general effluent, or if in vapor form is liquified, and maintained in the liquid phase until brought to the absorption zone wherein or prior to it passes through a pressure releasing valve whereby the liquid refrigerant undergoes cooling and a phase change to the vapor phase taking on the exothermic heat of absorption in the absorption zone. Part of the isobutane can be removed from the alkylation effluent in a fractionation section, if necessary. The cost of the process overall is substantially reduced as this process innovation can be applied to new and existing alkylation units with a minimum of capital and operation costs.

Having set forth the general nature of the invention, it will be best understood from a more detailed description employing accompanying drawings. Although the drawings illustrate general arrangement of apparatus of which the process of this invention can be practiced, it is not intended to limit the invention to the particular apparatus or materials described. It can be applied to certain commercial alkylation processes, for example, those using effluent refrigeration, cascade autorefrigeration, and emulsion flashing.

BRIEF DESCRIPTION OF THE DRAWING

In the accompanying drawings, forming a part of this specification, and in which like numerals are employed to designate like parts, FIGURE 3 shows the invention as applied to an alkylation unit using emulsion refrigeration.

DESCRIPTION OF THE PREFERRED EMBODIMENTS

Figure 1:
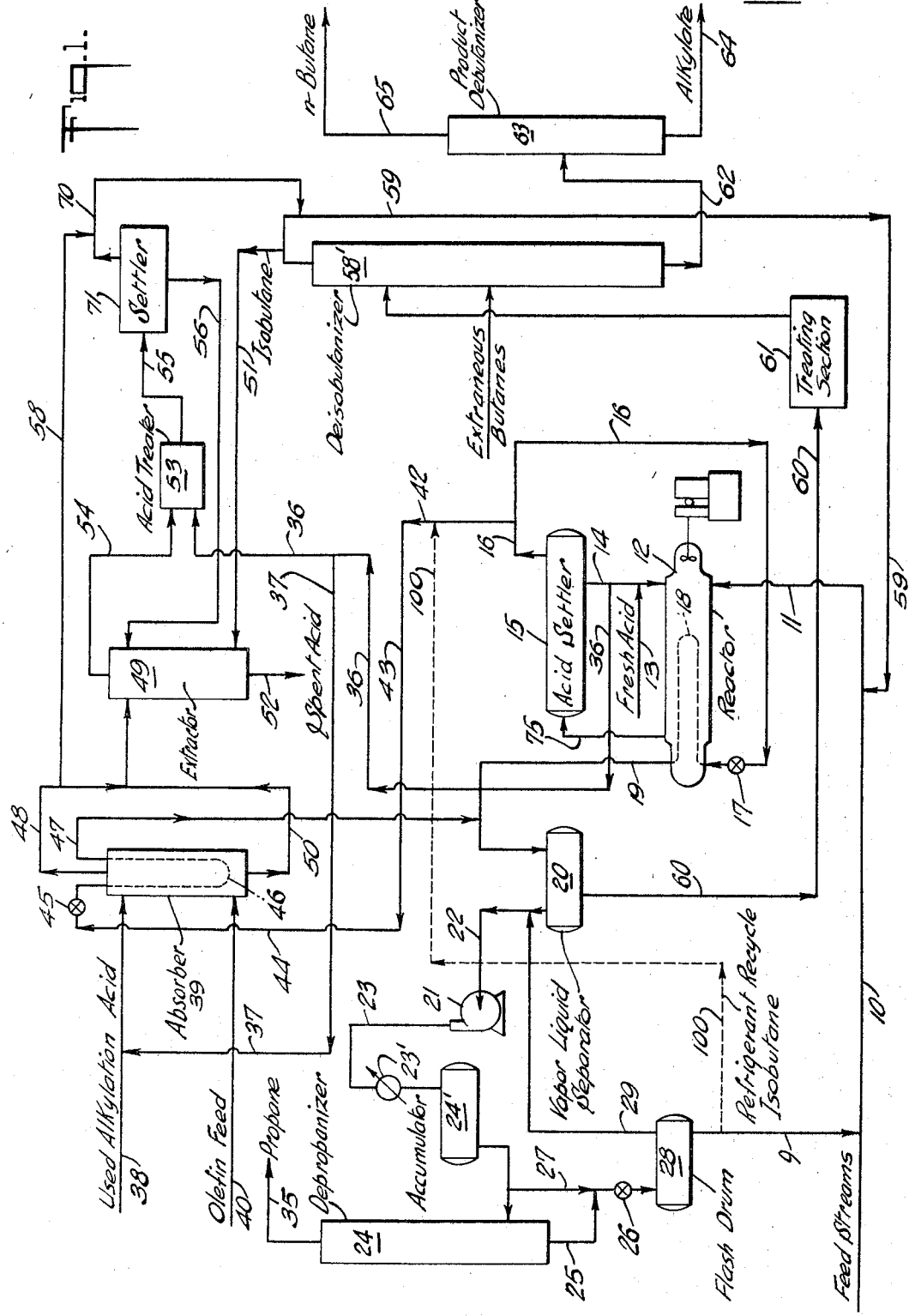
FIGURE 1 shows the invention as applied to an alkylation unit using effluent refrigeration.

Referring to the drawings in which dotted lines represent alternate schemes within the same general flow, in FIGURE 1 there is illustrated by way of schematic diagram an alkylation process in combination with an acid recovery process, the alkylation unit employing effluent refrigeration. Olefin, alkyl sulfates and isobutane through lines 10 and 11, fresh sulfuric acid alkylation catalyst through line 13 and recycle or used alkylation acid from acid settler 15 through line 14 are charged to alkylation reactor 12. Reaction mixture from alkylation reactor 12 is passed to an acid settler 15 through line 75. In acid settler 15 an acid phase and hydrocarbon phase are formed. The hydrocarbon phase which is the upper phase is withdrawn from the acid settler 15 through line 16 and passes through pressure reduction valve 17, through cooling coils 18 in alkylation reactor 12 to maintain a desirably low temperature in the alkylation zone by indirect heat exchange. Vapor and liquid hydrocarbons from cooling coils 18 are passed to vapor-liquid separator 20 via line 19. The vapor overhead from separator 20 is passed to compressor 21 via line 22 and thence from compressor 21 through a cooling condenser 23' via line 23 and accumulator 24' to a fractionating depropanizing column 24 from which propane is removed overhead in line 35. Isobutane is withdrawn from depropanizer 24 in line 25 and passes through a pressure reduction valve 26 in line 27 and thence via a flash drum 28 into line 9. Some propane which was not removed in line 35 from depropanizer 24 and isobutane in vapor form are withdrawn from the flash drum in line 29 and pass via line 22 to compressor 21 and thence in line 23 to the depropanizer 24. From flash drum 28, the cold, concentrated isobutane stream, identified as refrigerant recycle isobutane is returned to alkylation reactor 12 by lines 9, 10 and 11.

A portion of the recycle or used alkylation acid from settler 15 is passed through lines 14, 36, 37 and 38 to absorber 39. Olefin feed in liquid phase is passed to absorber 39 through line 40. A desirably low temperature is maintained in absorber 39 by passing a portion of the upper hydrocarbon phase comprising alkylate and a large amount of unreacted isobutane as hydrocarbon effluent from the alkylation reactor 12 and from alkylation acid settler 15 through lines 16, 42, 43 and 44 and pressure reduction valve 45 through cooling coils or tubes 46 in absorber 39. The effluent or vapor and liquid from cooling coil 46 is passed through line 47 to the common-vapor liquid separator 20 which treats the mixture in the manner above disclosed.

Several alternatives are available for handling the reaction product from absorber 39 depending upon the circumstances. As shown in FIG. 1, the overhead comprising hydrocarbon and dialkyl sulfate can be passed through line 48 and joined with line 50 to extractor 49. On the other hand, all or a portion of the overhead can be passed directly to alkylation reactor 12, not shown, or joined via line 58 with overhead from settler 71 in line 70, or joined with the isobutane overhead from deisobutanizer 58' in line 59. The bottoms from absorber 39 through line 50 and isobutane through line 51 from deisobutanizer 58' are passed to countercurrent extractor 49. Weak acidic material or spent sulfuric acid is discharged from extractor 49 through line 52. The overhead or extract from extractor 49 comprising isobutane and alkyl sulfates is passed to acid treater 53 via line 54. Recycle or used alkylation acid from alkylation settler 15 is passed through lines 14 and 36 into acid treater 53. The acid treated product from acid treater 53 is passed to settler 71 through line 55. The raffinate or bottoms from settler 71 can be sent to extractor 49, as shown, through line 56, or can be discharged as spent acid, or can be extracted with a hydrocarbon solvent, such as isobutane. The overhead from settler 71 can be passed through line 70 to join with isobutane in line 59 from deisobutanizer 58', and then the isobutane solution sent to alkylation reactor 12 through lines 59, 10 and 11.

A conventional fractionation system for the alkylate product is shown in FIGURE 1 with separate deisobutanizer and debutanizer. Other systems can be used, such as an isostripper with a single tower and with the reflux being furnished by introducing the charge on or near the top tray of the tower. It will also be apparent that the refrigerant recycle isobutane can be that product obtained after the depropanization. This product is received from flash drum 28 and passes via line 9 and line 100, represented by dotted line in the drawing, to line 42. The same effect as in the flow diagram described above is achieved.

The liquid from vapor liquid separator 20 is passed through line 60 through a conventional treating section 61, such as a caustic-water wash, hot water wash or clay treating, and the treated product passed to deisobutanizer 58'. The bottoms from the deisobutanizer 58 are passed to product debutanizer 63. The desired alkylate product of the desired vapor pressure is taken off from the bottom of the debutanizer 63 through line 64. Normal butane is taken off from debutanizer 63 as an overhead in line 65.

Effluent refrigeration employed in the flow scheme illustrated in FIG. 1 is essentially a means of economically obtaining a high isobutane concentration in the alkylation reaction mixture with a substantially reduced amount of conventional fractionation. The hydrocarbon portion of the reaction mixture or hydrocarbon effluent from the reactor after separation from the acid in the settler becomes the refrigerant used in the cooling elements of the reactor, and hence, the term effluent refrigeration. With effluent refrigeration usually as much as 50% or more of the total isobutane recycle can be supplied by the refrigerant recycle and only 50% or less by conventional fractionation. The feed streams of olefins and a large excess of isobutane, and sulfuric acid are continuously charged to the alkylation reactor which contains emulsion consisting of 35–65% by weight sulfuric acid and 35–65% of hydrocarbons, with the acid preferably in the continuous phase. It is apparent from this flow diagram that the hydrocarbons in the form of an effluent are utilized to control the exothermic nature of the absorption step in such a manner that the temperature control in the alkylation reactor 12 is not as critical as would be the case if the stream of dialkyl sulfate originating from the absorber would pass to the alkylation reactor without some means of cooling. It should be appreciated that a means that utilizes the stream in the process itself and cooled by efficient indirect heat exchange method is a valuable and significant contribution to this art.

The alkylation reactor is under sufficient pressure to keep all of the hydrocarbons in liquid phase, usually about 40–60 p.s.i.g. The emulsion leaving the reactor is passed to the settler where it is separated into an acid phase, which is recycled to the reactor, and a hydrocarbon phase. The hydrocarbon effluent from the settler is reduced in pressure to approximately 3 to 5 p.s.i.g., and is thereby cooled to about 20° F. by vaporization, largely of the isobutane. The resulting cooled liquid goes to the colling coils within the alkylation reactor. Much additional vaporization takes place within the coils as a result of the heat of the alkylation reaction itself. The liquid and vapor pass into the liquid-vapor separator. The vapor, which is mostly isobutane and some propane, is compressed and condensed. All or a portion of the liquid compressor condensate goes to the depropanizer, and after depropanization the depropanizer condensate bottoms are sent through a pressure-reduction valve 26 to a flash drum where cooling to approximately 18° F. is accomplished, by vaporization of a portion of the condensate at compressor suction of approximately 3–5 p.s.i.g. The cold liquid leaving the flash drum is the refrigerant recycle isobutane stream and is returned to the alkylation reactor.

Figure 2:
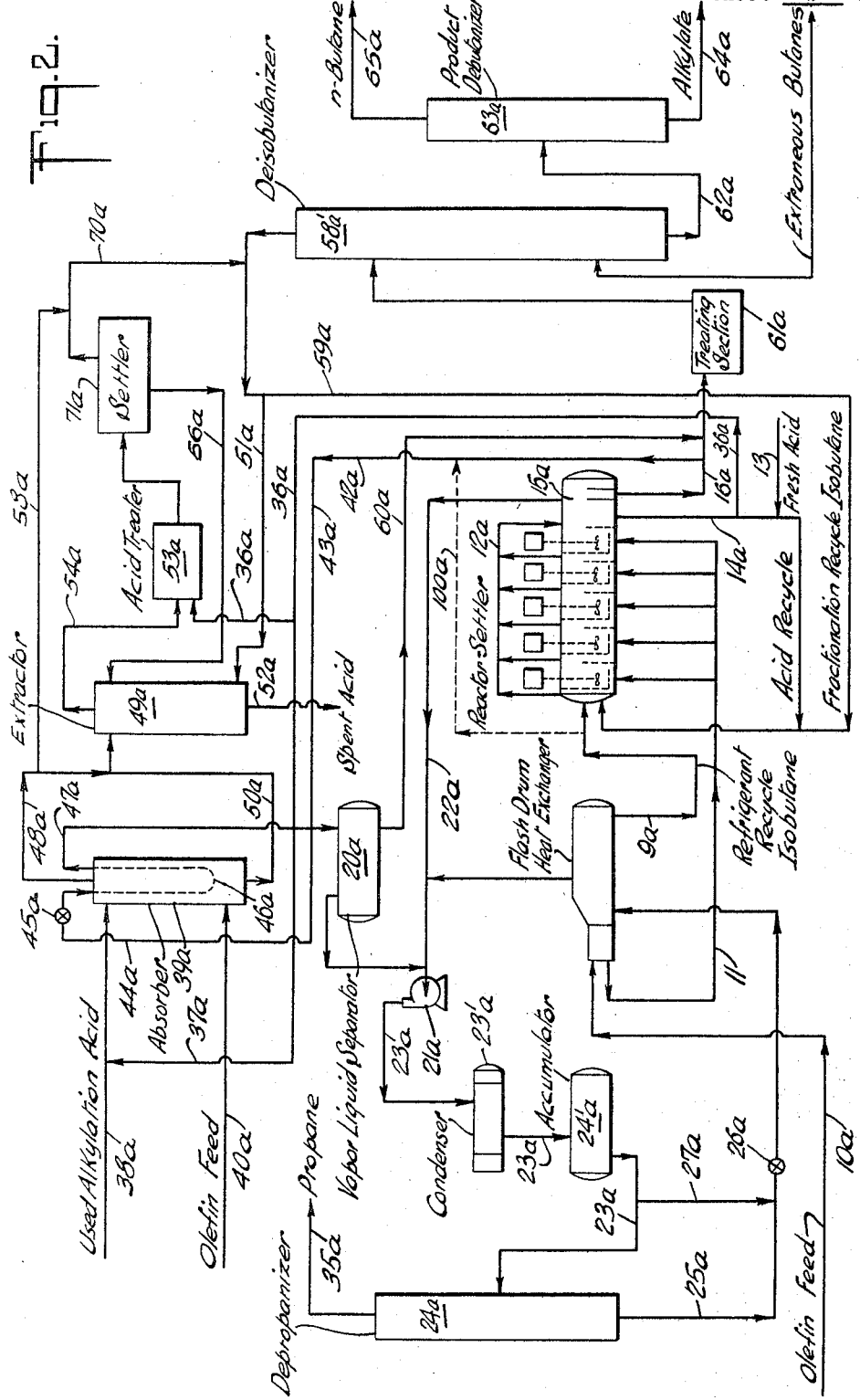
FIGURE 2 shows the invention as applied to an alkylation unit using cascade autorefrigeration.

Referring to another preferred embodiment of my invention, reference is made to FIG. 2. The flow diagram illustrated in FIG. 2 shows the control of the temperature in the absorbing step using a commercial alkylation unit designed for cascade auto-refrigeration. As in FIG. 1, a portion of the flow diagram is devoted to the acid recovery section in which the absorption step is an essential feature. Referring to the parts involving the invention, hydrocarbon reaction product comprising alkylate and a large amount of unreacted isobutane is passed from alklation acid settler 15a through lines 16a, 42a, 43a, 44a and pressure reduction valve 45a and then through cooling tubes 46a in absorber 39a. The effluent of vapor and liquid from the cooling tubes 46a within absorber 39a is passed through line 47a to vapor-liquid separator 20a. The vapor overhead from separator 20a as well as the vapor overhead from acid settler 15a are passed through a compression, depropanization, and flashing system by which a large percentage of the propane is eliminated from the system through line 35a in the same manner as in the flow system illustrated in FIG. 1 and described above. A cold, concentrated isobutane stream known as refrigerant recycle isobutane is returned to the alkylation reactor 12a through line 9a.

A portion of the recycle or used alkylation acid from acid settler 15a is passed through lines 14a, 36a, 37a and 38a to absorber 39a. Olefin feed in liquid phase is passed to absorber 39a via line 40a. A desirably low temperature is maintained in absorber 39a by passing a portion of the upper hydrocarbon phase comprising alkylate and a large amount of unreacted isobutane, i.e. effluent from the alkylation reactor and from alkylation acid settler 15a through lines 16a, 42a, 43a and 44a and pressure reduction valve 45a through cooling tubes 46a in absorber 39a. The effluent of vapor and liquid from cooling tubes 46a is passed through line 47a to the common vapor-liquid separator 20a previously mentioned.

In the cascade-auto-refrigeration system, an integrated reactor is used which usually has a plurality of reaction zones and a settler, all in one vessel. The number of reaction zones will vary from 2 to 8, depending upon the desired alkylation capacity. The reaction temperature is controlled by the evaporation of light hydrocarbons directly from the sulfuric acid-hydrocarbon mixture. Hence, cooling elements in the reactor are not required. The hydrocarbon and acid flow in series or cascade through the reaction zones with the olefin feed entering each zone in parallel. As in the case of effluent refrigeration, feed streams of olefin and isobutane are charged to the alkylation reactor after being cooled by indirect heat exchange. Approximately an equal amount of olefin is usually charged to each of the reaction zones, with all of the olefin-free isobutane stream being charged ahead of the first reaction zone to the preflash zone. The pressure in the first reaction zone can be approximately 24 p.s.i.g. and will drop about 1.5 to 2.0 pounds in each zone, giving a pressure of approximately 14 pounds in the acid settler 15a. The exact pressures depend upon a number of factors, such as composition of the reaction mixture, the number of reaction zones, and the temperature desired, but there is always a pressure gradient to provide proper flow through the reactor, with the lowest temperature being in the last reaction zone.

The vapors which are evaporated from the alkylation reaction mixture pass through a mist extractor to remove acid and liquid hydrocarbon prior to passing to the compressor. Part of the compressor condensate is sent to a depropanizer for removal of propane. The rest of the compression condensate, along with the depropanizer bottoms, and dried isobutane recycle are sent to the flash drum-heat exchanger. The resulting vapor is set back to the compressor while the cold liquid having a high percentage of isobutane is returned to the reactor as the refrigerant recycle isobutane. As in the case of effluent refrigeration, this reduces the load on the deisobutanizer. Generally the whole process scheme reduces the heat load upon the alkylation reactor 12a as it eliminates the need for stringent control by controlling the temperature during the absorption step in the acid recovery process.

It is apparent from the flow system that the refrigerant recycle isobutane can be fed to line 46a to effect indirect heat exchange by withdrawing at least a portion of it from line 9a in line 100a and passing thence through lines 42a, 43a, 44a and into 46a via pressure reduction valve 45a.

The same alternatives are available for handling the reaction product from absorber 39a, for the flow of FIG. 2 as for FIG. 1, depending upon the circumstances. The overhead can be passed through line 48a and joined at 50a to extractor 49a. All or a portion of the overhead can be passed directly to alkylation reaction 12a, not shown, or joined via line 58a with the overhead from settler 71a in line 70a, or joined with the isobutane overhead from deisobutanizer 58a' in line 59a. The bottoms from absorber 39a through line 50a and isobutane through lines 59a and 51a are passed to countercurrent extractor 49a. Weak acidic material or spent sulfuric acid is discharged from extractor 49a through line 52a. The overhead or extract from extractor 49a comprising isobuane and alkyl sulfates is passed to acid treater 53a through line 54a. Recycle or used alkylation acid from acid settler 15a is passed through lines 14a and 36a to acid treater 53a.

The balance of the flow not specifically described above in FIG. 2 proceeds in the same manner described above for the flow of FIG. 1.

Referring to still another embodiment of my invention, FIG. 3 illustrates a process flow utilizing an emulsion flashing alkylation process. Referring to FIG. 3, feed streams of olefin, alkyl sulfates and isobutane through line 10b, and fresh sulfuric acid alkylation catalyst through line 13b, and recycle or used alkylation acid from flash vessel and settler 15b through line 14b are charged to alkylation reactor 12b. The reaction mixture largely in emulsified form is passed to flash vessel and settler 15b through line 75b and pressure reduction valve 76b. The temperature of the acid and liquid hydrocarbon can be reduced to a temperature considerably below alkylation temperatures, e.g. about 20° F. A portion of the liquid hydrocarbon phase comprising alkylate and a large amount of unreacted isobutane is passed from flash vessel and settler 15b through lines 16b, 42b, 43b and 44b through cooling tubes 46b in absorber 39b. The effluent of vapor and liquid from cooling tubes 46b is passed through line 47b to vapor liquid separator 20b. The vapor overhead from flash vessel and settler 15b, as well as vapor overhead from separator 20b, are passed through a compression, depropanization and flashing system by which propane is eliminated from the system through line 35b in the same manner as described above for the flow shown in FIGURES 1 and 2. A cold, concentrated isobutane stream known as refrigerant recycle isobutane is returned to alkylation reactor 12b through lines 9b and 10b.

A portion of the recycle or used alkylation acid is passed through line 36b to absorber 39b. Olefin feed in liquid phase is passed to absorber 39b through line 40b. A desirably low temperature is maintained in absorber 39b by passing a portion of the liquid hydrocarbon phase comprising alkylate and a large amount of unreacted isobutane from flash vessel and settler 15b through lines 16b, 42b, 43b and 44b through cooling tubes 46b in absorber 39b. The effluent from cooling tubes 46b is passed through line 47b to the common vapor liquid separator 20b.

The balance of the flow for FIG. 3 is essentially the same as described above for FIGURES 1 and 2 and for simplicity is not set forth herein in detail.

In all three figures instead of using the total alkylation settler hydrocarbon effluent, it is advantageous to use, in some instances, only a portion of it, that is, all or a portion of the refrigerant recycle isobutane stream from the flash drum for indirect heat exchange or cooling of the olefin absorber 39. This is shown in FIGURE 1 by dotted line 100 from line 9 to line 42 and subsequently to cooling coil or tube 46 in absorber 39 and correspondingly in FIGURES 2 and 3. The refrigerant recycle isobutane has a temperature below about 30° F., and is usually at about 18° F., while the total alkylation settler hydrocarbon is at alkylation temperature. In the case of the operation according to the flow scheme of FIGURES 1 and 2, it is at about 40–50° F. In the case of the flow of FIGURE 3, the alkylation settler hydrocarbon, which is identified as flash vessel settler hydrocarbon, can also be at quite a low temperature, e.g., 18° F., or quite a bit lower than alkylation temperature. The refrigerant recycle isobutane, in any case, for the flow of all three figures, is characterized not only by its low temperature, but also by its low percentage of propane and alkylate. After passing through the processing sequence described, it has a propane and alkylate content of less than 3.0 percent by volume of each, and preferably below 1.0 percent. The isobutane concentration can vary depending upon the alkylation conditions. However, the isobutane concentration is almost always above 40% by volume, and preferably above 60%, and can be as high as about 80%. The total alkylation settler hydrocarbon effluent can have as high as 10–15 percent by volume of propane and 10–15 percent by volume of alkylate, and as low as 40–50 percent by volume of isobutane, although it can have as high as 70–80% of isobutane and a correspondingly lower percentage of propane and alkylate.

Example

In the following example the feed stocks shown in Table 1 are employed by the apparatus of FIGURE 1.

TABLE I

| | Isobutane | Propane-propylene (wt. percent) | Butane-butylene (wt. percent) |
|---|---|---|---|
| Ethane | | 0.4 | |
| Propylene | | 62.3 | 0.1 |
| Propane | 6.9 | 33.7 | 2.7 |
| Isobutane | 91.1 | 3.6 | 34.6 |
| n-Butane | 2.0 | | 11.0 |
| Isobutylene | | | 15.9 |
| Butylene-1 | | | 9.5 |
| Butylene-2 | | | 22.9 |
| Pentanes | | | 3.3 |
| | 100.0 | 100.0 | 100.0 |

Five cc. per minute of used alkylation acid from alkylation settler 15 titrating 91.0% $H_2SO_4$ is charged to countercurrent absorber tower 39 near the top held at 40° F. Fresh propanepropylene feed at 50° F. at the rate of 22.5 cc. per minute is charged to absorber 39 near the bottom held at about 25° F. Absorber 39 is operated at about 75 pounds per square inch gauge in the liquid phase. Refrigerant recycle isobutane at 18° F. from flash drum 28 is passed through lines 9, 100, 42, 43 and 44 and pressure reduction valve 45 into cooling coils 46 in sufficient quantity to hold the desired temperature of 25 to 40° F. in absorber 39 by indirect heat exchange. Flashing of isobutane in the cooling coils takes place at 2–5 p.s.i.g., thereby maintaining a refrigerant temperature of about 15–20° F. Gas and liquid from cooling coils 46 are passed through line 47 to vapor liquid separator 20 and on through the condensing and fractionation system for recycle of refrigerant isobutane back to the cooling coils 46.

Absorber reaction mixture from absorber 39 is passed through line 48 to countercurrent extractor 49 near the top. Liquid isobutane at the rate of 140 cc. per minute from deisobutanizer 58 through line 51 is charged to extractor 49 near the bottom. Extractor 49 is operated countercurrently at about 70 p.s.i.g. in the liquid phase at about 50° F. Overhead from extractor 49 comprising dipropyl sulfate and isobutane is passed to acid treater 53 and thence to settler 71. The acid treated extract phase from settler 71 is passed to alkylation reactor 12. The lower acidic phase from extractor 49 comprising alkylation contaminants and propyl sulfate is discarded at the rate of 0.65 per minute, which corresponds to a net overall acid consumption of about 0.2 pound per gallon of alkylate.

Liquid butane-butylene feed at the rate of 53 cc. per minute through lines 10 and 11, 175 cc. per minute of isobutane from deisobutanizer 58′ through lines 51, 59, 10 and 11, and 0.2 pound per hour of 99.5% sulfuric acid in lines 13 and 14 are charged to alkylation reactor 12, along with recycle acid through line 14 from acid settler 15. Reaction mixture from alkylation reactor 12 is passed to settler 15. The hydrocarbon phase is caustic and water washed and stabilized to produce 25 gallons per day of alkylate product.

The research octane of the stabilized alkylate is 95.6 clear and 107.1 with 3.0 cc. of TEL. The motor octane is 92.6 clear and 106.5 with 13.0 of TEL.

ABSORPTION

In the absorption step propylene is preferred as the olefin feed stock, although higher molecular weight olefins may be used, especially the butylenes and amylenes.

The absorption may be carried out in either vapor or liquid phase, or in a combination of the two. For example, part of the absorption may be carried out in the vapor phase, followed by liquid phase for the final portion of the absorption step for a high conversion of the acid to dialkyl sulfates.

Acid-oil complex or alkylation contaminant is formed not only during the alkylation reaction in which a large excess of isobutane is present, but also to a limited extent during the absorption step in which an olefin is reacted with sulfuric acid under non alkylation conditions, such as in the substantial absence of isobutane or in the presence of isobutane but with sulfuric acid of such a low concentration or low titratable acidity that it is non catalytic for alklation of olefins with isoparaffins.

Part of the cooling, in addition to means already described, in the absorption step may be effected, if desired, by introducing all or a part of the charge in liquid phase and allowing it to vaporize by the heat of reaction in the absorber. Some of the cooling may also be effected by using charge streams to the absorber cooled to a temperature below the absorber reaction temperature, for example, the used acid from the emulsion flashing alkylation operation of FIGURE 3 at 20° F. or lower.

Used alkylation acid having a titratable acidity of 88–93% by weight is the preferred acid charge stock for the absorption step, although in some cases, for example, if amylenes are being alkylated, it may have a concentration as low as 80–85%. Acid from other sources, such as fresh acid, or acid from chemical reactions, and acid from the acid treatment of petroleum naphtha or lube oil may also be used.

When using strong acid with propylene, a temperature of 20–60° F. is satisfactory. When butylenes are used, especially isobutylene or isobutylene containing charge stocks, quite low temperatures and short times are advantageous.

Relatively concentrated olefin stocks such as those from catalytic cracking are preferred, although from an economic standpoint lean stocks such as lean propylene stock having only a value of fuel are advantageous and are satisfactory. When using propylene and butylene feeds I prefer to carry out the absorption under conditions to get a high concentration of dialkyl sulfates and in general as high a concentration as possible. However, when using higher molecular weight olefins in some cases it is advantageous to carry out the absorption so as to give a product of alkyl sulfates predominantly the mono rather than the di or predominantly alkyl acid sulfates.

The absorption step may be effected in contacting equipment well known in the art, for example mixer-settlers, centrifugal contactors, countercurrent towers, and two or more mechanically stirred reactors operating to give countercurrent flow. Countercurrent contacting is preferred in order to obtain a high conversion of the acid to dialkyl sulfates, and in most cases for a high conversion of olefin. When using my invention the cooling can be readily furnished by using a reactor with a tube bundle in it, or a reactor with a jacket around it, or by using an exchanger outside the reactor for indirect cooling.

If the absorber reaction product should contain a large amount of inerts, such as propane and n-butane, some of it may be removed, if desired, prior to charging it to the alkylation zone.

EXTRACTION OF ABSORBER REACTION PRODUCT

In general, reasonably low temperatures and reasonably short times are preferred for the hydrocarbon extraction of the absorber reaction product. For example, a temperature range of 30–60° F. with a few minutes residence time is satisfactory. However, reasonably good results have been obtained at ambient temperatures as high as 85–100° F. The conditions will depend somewhat upon the absorption product and the olefin used for the absorption step.

The extraction step may be effected in equipment known in the art, for example, mixer-settlers, centrifugal contactors or countercurrent towers, for example, a Rotating Disc Contractor.

The separation of the dialkyl sulfates from the acid-oil reaction product and water may be made in a variety of ways, as disclosed in my patent U.S.P. 3,227,774, of Jan. 4, 1966 entitled "Sulfuric Alkylation Acid Recovery." For example, the absorber reaction mixture may be diluted with a large quantity of water, extracted with a hydrocarbon, such as isobutane, or a hydrocarbon solution may be chilled.

In general it is easier to extract the dialkyl sulfate than the alkyl acid sulfate. However, the ease of extraction of the dialkyl sulfates and also the alkyl acid sulfates increases with molecular weight of the alkyl group. Thus, the methyl sulfates are the most difficult to extract and the butyl and amyl sulfates are easier to extract than the propyl sulfates. Thus, it is desirable to use quite good and efficient conditions in the extraction step, especially when propyl sulfates are being extracted, so as to extract not only the dialkyl sulfate, but also the alkyl acid sulfate. Such conditions includes a high solvent dosage in the order of six mols per mol of alkyl sulfate, or higher, raffinate recycle, multi-stage countercurrent extraction, and optimum charge rate for a given extraction vessel.

The raffinate or spent acid from the extraction step will comprise water, alkyl acid sulfate, dialkyl sulfate and the reaction product of acid and polymeric oil formed during the alkylation, absorption, and acid treating steps. The extract comprises the hydrocarbon solvent and dialkyl sulfate, and a limited amount of alkyl acid sulfate. If desired, the extract may be treated with sulfuric acid.

It is the objective to approach as nearly as possible only acid-oil reaction product and water in the spent acid or acid phase, with all of the alkyl sulfates including the alkyl acid sulfates in the extract or organic phase.

ACID TREATMENT OF EXTRACT

Polymeric oil contaminant which can be present to a small extent in the extractor extract is quite unsaturated and it reacts readily with strong sulfuric acid, such as fresh make-up acid used for the alkylation step, or used alkylation acid of about 90% concentration. Weaker acid, for example, acid of about 80% concentration with 20% of water or 90% acid with 10% water may be used, but considerably more acid, in excess, is required. When weaker acid is used, more of the alkyl sulfates become dissolved in the excess acid. The acid-oil reaction product or complex and the alkyl sulfates are surprisingly stable over the conditions of operation. For example, quite good results have been obtained by acid treating in isobutane solution with used alkylation acid of about 90% concentration at a temperature of 85° F. and a time as long as one hour. However, a temperature not over about 40–60° F. and a short time on the order of a few minutes or less are preferred. Actually a very short time such as would be obtained in the mixing with a pressure drop orifice appears to be satisfactory.

If enough excess acid, a long enough time and a high enough temperature are used, adverse reactions, such as conversion of the dialkyl sulfate to alkyl acid sulfate or even hydropolymerization could result. Hence minimum time, temperature and acid are advantageous.

The acid-oil reaction product is viscous but is free flowing under gravity conditions under the conditions of operation.

If solvent is not present during the acid treating step or present during the settling period, it is much more difficult to determine the interface between the acid phase and organic phase. In addition, solvent helps to give a low yield of the acid phase or a high yield of the desired organic phase.

ALKYLATION

In general the conditions for the alkylation step are those which are well known in the art. However, the bulk of the make-up acid is charged to alkylation as alkyl sulfates which result from the recovery section, and only a minor proportion of the acid is charged as the fresh make-up acid of the usual 98.0–99.5% concentration. Since the alkyl sulfates are substantially water free the trend is for the system catalyst, when using the acid recovery process, to be of lower water content and in, general, of superior quality in that a lower end point alkylate of higher octane value is obtained. Of course, if desired, less drying of charge stocks may be used, and in such a case the water content of the system catalyst could be as high as in conventional operation without acid recovery. The sulfuric acid in the alkylation system is usually maintained within a range of about 88–95% by purging spent acid from the system. In a multiple reactor system the acid of lowest concentration will be purged and sent to the acid recovery system.

A large excess of isobutane is used, for example, as much as 60–80 volume percent of the hydrocarbons in the alkylation reaction mixture. Consequently, a large quantity of isobutane must be recovered and recycled for reuse in the alkylation process. It is also available for the recovery process as described.

In addition to the olefin which is charged to the alkylation step in the form of alkyl sulfates additional fresh olefin is usually charged to the alkylation step. For example, when propylene and/or butylenes, and especially propylene, are used for the absorption step, it is advantageous to use butylene also in the alkylation step.

There are many different specific ways in which my invention may be used, for example, because of existing conditions or because of charge stocks, especially when used in combination with alkylation when more than one alkylation unit or reactor is operated, as exemplified by but not limited to the following with two alkylation units, A and B and recovery unit R.

(1) Used acid from A and B is charged to R and recovered acid from R is charged only to B.

(2) Used acid from A is charged to R and used acid from B is charged to A, and recovered acid from R is charged to B.

(3) Used acid from A is charged to B and used acid from B is charged to R, and recovered acid from R is charged to A.

(4) Used acid from A and B is charged to R, and recovered acid from R is charged to A and B.

(5) When applied to two alkylation reactors A and B (rather than to two alkylation units A and B) operated in series on acid wtih a single settler for both reactors, used acid from A is charged to B, used acid from B is charged to R, and recovered acid from R is charged to A. In principle this is the same as (2) above. It is the same principle also as in a multi reaction zone reactor such as in a cascade reactor with series flow of hydrocarbon and emulsion with only a final settler, or in a multiple reactor unit with parallel flow of hydrocarbon and emulsion with a settler for each reactor or pair of reactors.

In any of the above general modifications a part of the acid sent to recovery R may be from another source, including nonalkylation sources, and not from sources A and B.

What is claimed is:

1. An improvement for alkylating an isoparaffin with an olefin wherein isoparaffin and olefin are charged into an alkylation reaction zone containing reaction mixture together with sulfuric acid, an alkylation effluent comprising sulfuric acid catalyst and hydrocarbons is withdrawn and separated into a hydrocarbon effluent portion and a used sulfuric acid portion, said used sulfuric acid is fed into an absorption zone to which is admitted olefin to form an alkyl sulfate and said alkyl sulfate is thereafter charged into the alkylation zone, the improvement comprising passing at least a portion of said hydrocarbon effluent comprising normally gaseous hydrocarbon from said alkylation reaction zone in indirect heat exchange with the contents of said absorption zone to effect cooling in said absorption zone.

2. An improvement according to claim 1 wherein said hydrocarbon effluent comprising normally gaseous hydrocarbon is under sufficient pressure so that it is in the liquid phase upon leaving said alkylation reaction zone and is passed ino a zone of decreased pressure as it passes in indirect heat exchange and at least part of said hydrocarbon effluent is flashed thereby effecting cooling.

3. An improvement according to claim 1 wherein at least a portion of said hydrocarbon effluent is passed in indirect heat exchange with at least part of the contents of said alkylation reaction zone, effecting vaporization of part of the hydrocarbon components of said hydrocarbon effluent and concomitant cooling of the said reaction mixture.

4. An improvement according to claim 1 wherein a portion of said hydrocarbon effluent under pressure is recycled to said alkylation zone in indirect heat exchange whereby the contents of said alkylation zone are cooled.

5. An improvement according to claim 1 wherein said hydrocarbon effluent phase is passed through said absorption zone in indirect heat exchange and said used sulfuric acid phase is recycled to said alkylation zone.

6. An improvement according to claim 1 wherein said isoparaffin is isobutane and the said hydrocarbon effluent comprises isobutane.

7. An improvement according to claim 1 wherein said olefin is propylene.

8. An improvement according to claim 1 wherein the feed to the alkylation zone contains propane.

9. An improvement according to claim 1 wherein the hydrocarbon effluent comprises at least 60% by volume isobutane.

10. An improvement according to claim 9 wherein said hydrocarbon effluent contains no greater than 3% by volume propane and no greater than 3% by volume of alkylate.

11. An improvement in accordance with claim 1 wherein a portion of said hydrocarbon effluent is passed in indirect heat exchange relationship with said alkylation zone to effect cooling by vaporization of more volatile components of said hydrocarbon effluent.

12. An improvement in accordance with claim 1 wherein said alkylation reaction zone is maintained under conditions of pressure and temperature to cause vaporization of more volatile hydrocarbon components of said reaction mixture to effect cooling in said alkylation zone, continuously withdrawing said reaction mixture from said alkylation zone and condensing said vaporized components prior to passing said hydrocarbon effluent to said absorption zone.

13. An improvement in accordance with claim 1 wherein said alkylation effluent is passed to a flash vaporization zone wherein more volatile hydrocarbon components are vaporized with concomitant cooling of the remaining liquid alklyation effluent, separating said alkylation effluent into a cooled hydrocarbon effluent portion and a cooled used sulfuric acid portion and wherein a portion of said cooled hydrocarbon effluent is passed to said absorption zone.

14. An improvement in accordance with claim 13 wherein said separated cooled acid portion is passed to said absorption zone to effect cooling in said absorption zone.

15. An improvement in accordance with claim 1 wherein at least a portion of said normally gaseous hydrocarbon comprising said hydrocarbon effluent is refrigerant recycle isobutane.

16. An improvement in accordance with claim 15 in which said refrigerant recycle isobutane is at a temperature below about 30° F.

References Cited

UNITED STATES PATENTS

| | | | |
|---|---|---|---|
| 3,007,983 | 11/1961 | Clauson | 260—683.61 |
| 3,038,948 | 6/1962 | Trow | 260—683.62 |
| 3,227,775 | 1/1966 | Goldsby | 260—683.62 |

DELBERT E. GANTZ, *Primary Examiner.*

G. J. CRASANAKIS, *Assistant Examiner.*